United States Patent [19]
Tamura

[11] 4,427,996
[45] Jan. 24, 1984

[54] TELEVISION CAMERAS

[75] Inventor: Eiji Tamura, Atsugi, Japan

[73] Assignee: Sony Corporation, Tokyo, Japan

[21] Appl. No.: 327,085

[22] Filed: Dec. 3, 1981

[30] Foreign Application Priority Data

Dec. 8, 1980 [JP] Japan ................................ 55-172756

[51] Int. Cl.³ ............................................. H04N 3/26
[52] U.S. Cl. ..................................... 358/228; 358/225
[58] Field of Search ....................... 358/209, 225, 228

[56] References Cited

U.S. PATENT DOCUMENTS

| | | | |
|---|---|---|---|
| 3,555,181 | 1/1971 | Thommen | 358/228 |
| 4,174,526 | 11/1979 | Geurts | 358/228 |
| 4,268,866 | 5/1981 | Rodgers | 358/228 |
| 4,300,167 | 11/1981 | Miller | 358/228 |
| 4,365,272 | 12/1982 | Nagai | 358/228 |

Primary Examiner—Michael A. Masinick
Attorney, Agent, or Firm—Lewis H. Eslinger; Alvin Sinderbrand

[57] ABSTRACT

A television camera comprises a pick-up element, an iris, a variable gain amplifier for a picked-up signal, and first and second comparators to compare the video level of the picked-up signal to be supplied to a pick-up signal system following the variable gain amplifier with first and second reference levels and respectively supply first and second compared output signals therefrom to the iris and to the variable gain amplifier for controlling them thereby to form first and second automatic control loops, whereby when the amount of light incident on said pick-up element is above a predetermined value, the first automatic control loop is actuated and when it is below the predetermined value, the second automatic control loop is actuated.

6 Claims, 5 Drawing Figures

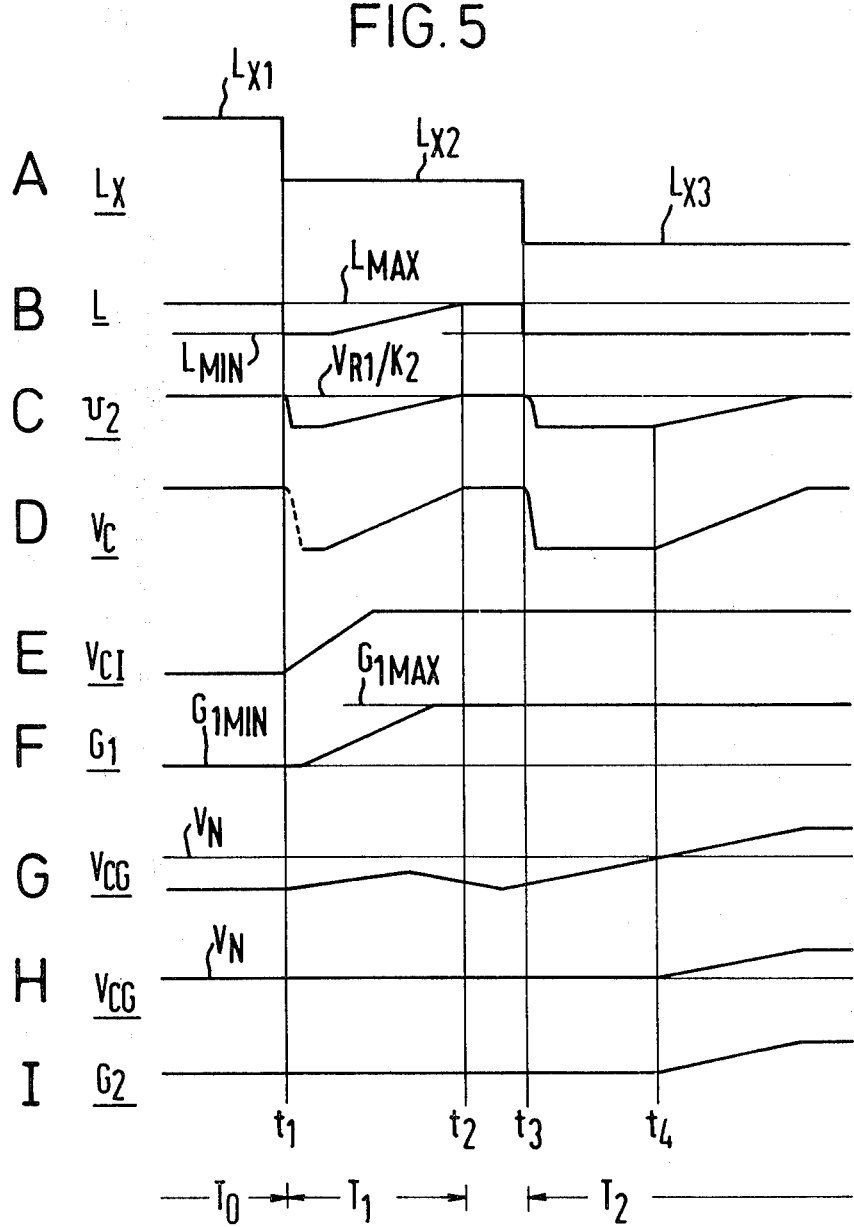

TELEVISION CAMERAS

BACKGROUND OF THE INVENTION

1. Field of the Invention

This invention relates to television cameras.

2. Description of the Prior Art

Two examples of previously proposed television cameras will first be described with reference to FIGS. 1 and 2 respectively of the accompanying drawings, which are block diagrams of the cameras.

The television camera of FIG. 1 comprises a pick-up tube 1 forming a pick-up element (a solid-state pick-up element such as a charge coupled device (CCD) may also be utilized) and an automatic iris device 2 associated with a light receiving target of the pick-up tube 1. The automatic iris device 2 drives an iris thereof by a motor or a meter. A lens system (not shown) is also provided. The picked-up signal from the pick-up tube 1 is supplied, through a preamplifier 3 and a variable gain amplifier 4, to a video processor 5 which supplies an output picked-up video signal to an output terminal 6.

First and second comparators 7 and 8, which may be differential amplifiers, supply first and second compared output signals to the automatic iris device 2 and to the variable gain amplifier 4 respectively to control them.

First and second variable reference level (voltage) signal sources 9 and 10 supply first and second reference level (voltage) signals to noninverting input terminals of the first and second comparators 7 and 8, respectively. The picked-up signal from the variable gain amplifier 4 is supplied to a level detector 11 wherein a video level (voltage) detecting signal is detected and supplied to an inverting input terminal of the second comparator 8 so that the video level thereof is compared with the second reference voltage.

The picked-up signal from the preamplifier 3 is supplied to another level detector 11' wherein another video level (voltage) detecting signal is detected. The signal thus detected is supplied to an inverting input terminal of the first comparator 7 so as to compare the video level with the first reference voltage.

In the television camera of FIG. 2, the video level (voltage) detecting signal from the level detector 11 is also supplied to the inverting input terminal of the first comparator 7 thereby to compare the video level with the first reference voltage.

Thus, in the television cameras of FIGS. 1 and 2, there are respectively formed first and second automatic control loops (an automatic iris control loop and an automatic gain control (AGC) loop) 12 and 13 respectively to control the automatic iris device 2 and the variable gain amplifier 4.

These television cameras have certain drawbacks as follows. The television camera of FIG. 1 is provided with two level detectors 11 and 11', thus causing a complicated arrangement. Moreover, the total response time of the control loops 12 and 13 is the product of the response times of the first and second control loops 12 and 13, so that it becomes too long. Accordingly, the stabilization time of the automatic control loop becomes long.

The television camera of FIG. 2 does not have these defects, but instead, the automatic control tends to be unstable. Moreover, even when an adequate amount of light is incident on the pick-up tube 1, the light energy entering the pick-up tube 1 via the automatic iris device 2 does not assume an optimum value in practice, thus causing deterioration of the signal to noise (S/N) ratio of the picked-up signal.

OBJECTS AND SUMMARY OF THE INVENTION

In view of the above aspects, one object of the present invention is to provide a television camera of a simple arrangement which can have a short response time of the total automatic control loop, a stable automatic control, optimum incident light on the pick-up element, and a good S/N ratio of the picked-up signal.

Another object of the present invention is to provide a television camera which can positively or reliably select either of the compared output signal or the reference level signal each from two comparators as the control signal to be supplied to the variable gain means for the picked-up signal.

According to the present invention there is provided a television camera comprising a pick-up element, an iris, a variable gain amplifier for a picked-up signal, and first and second comparators to compare the video level of the picked-up signal to be supplied to a pick-up signal system following the variable gain amplifier with first and second reference levels and respectively supply first and second compared output signals therefrom to the iris and the variable gain amplifier for controlling them thereby to form first and second automatic control loops, characterised in that when the amount of light incident on the pick-up element is above a predetermined value, only the first automatic control loop is acuatated and when the amount of light incident on the pick-up element is below the predetermined value, only the second automatic control loop is actuated.

According to the present invention there is also provided a television camera comprising a pick-up element, an iris, a variable gain amplifier for a picked-up signal, and first and second comparators to compare a video level of the picked-up signal to be supplied to a pick-up signal system following the variable gain amplifier with first and second reference levels and respectively supply first and second compared output signals therefrom to the iris and the variable gain amplifier for controlling them, characterised by a selecting circuit for comparing a level of the second compared output signal with a third reference level and for selecting the signal of either level to be supplied to the variable gain amplifier, thereby forming first and second automatic control loops operative such that when the amount of light incident on the pick-up element is above a predetermined value, the first automatic control loop is actuated to control the iris and when the amount of light incident on the pick-up element is below the predetermined value, the second automatic control loop is actuated to control the variable gain amplifier.

According to the present invention there is also provided a television camera comprising a pick-up element, an iris, a variable gain amplifier for a picked-up signal, and first and second comparators to compare a video level of the picked-up signal with first and second reference levels and respectively supply first and second compared output signals therefrom to the iris and to the variable gain amplifier for controlling them, characterised by a selecting means for comparing the level of the second compared output signal with a third reference level and for selecting one or the other to be supplied to the variable gain amplifier, and a controlling means for ON/OFF controlling the selecting means thereby to form the first and second automatic control loops, whereby when the light incident on the pick-up element is above a predetermined value, the first automatic control loop is actuated, and when the light incident on the pick-up element is below the predetermined value, the second automatic control loop is actuated.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 is a waveform diagram used for explaining the operation of the embodiment.

DESCRIPTION OF THE PREFERRED EMBODIMENTS

Figure 1:
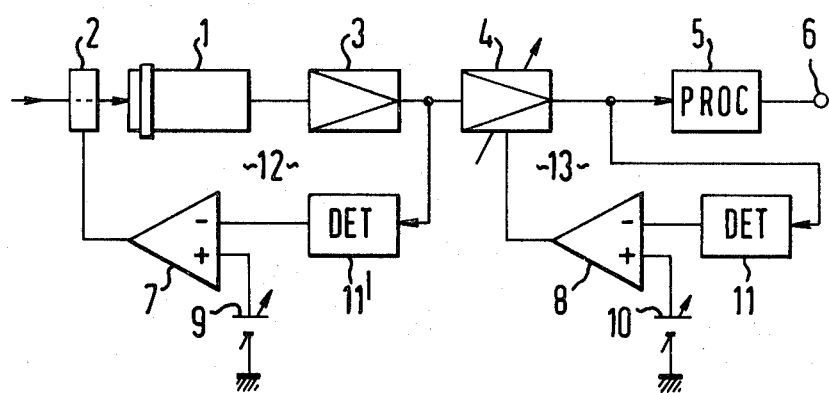
FIGS. 1 and 2 are block diagrams of respective previously proposed television cameras.
Figure 2:
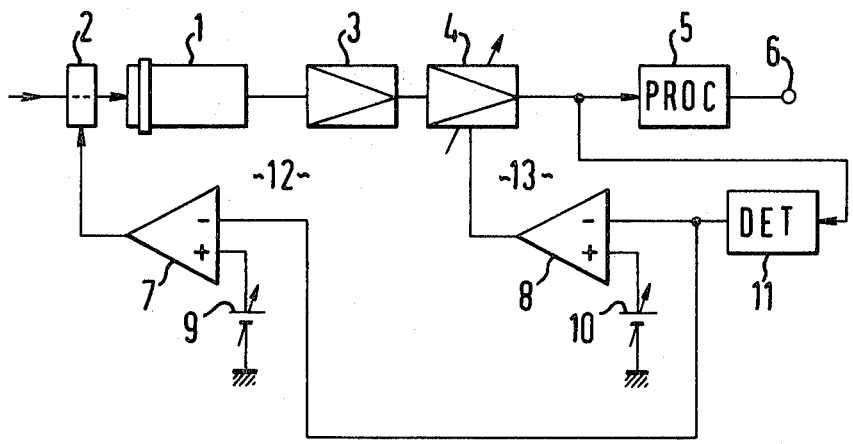
Figure 3:
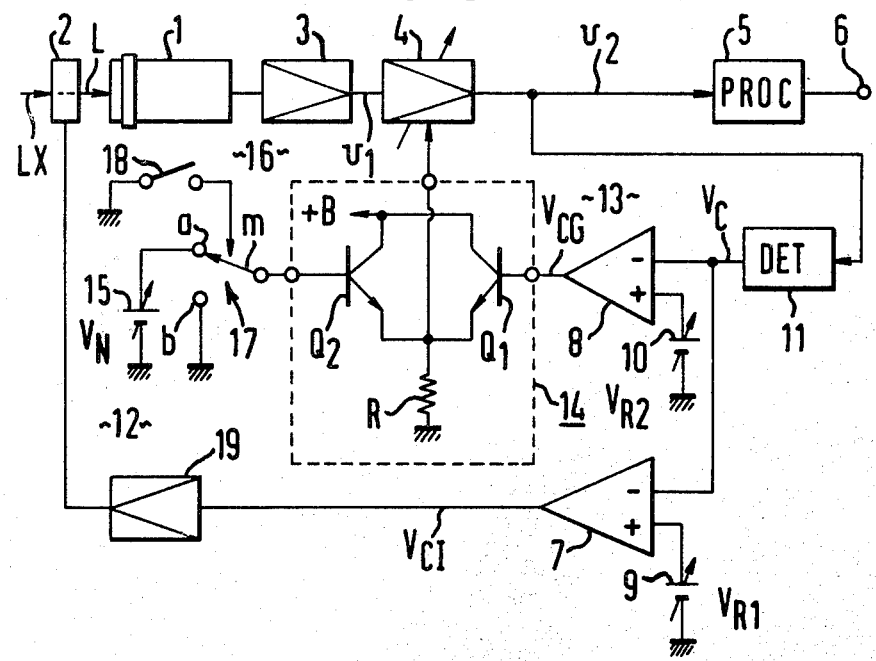
FIG. 3 is a block diagram showing an embodiment of television camera according to the invention.
Figure 4:
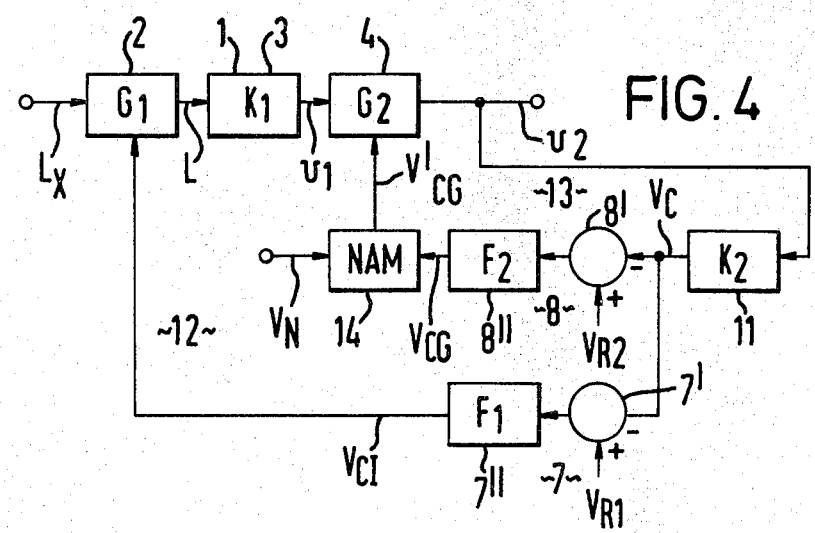
FIG. 4 is a block diagram showing an equivalent circuit of FIG. 3.

Where elements in FIGS. 3 and 4 correspond to elements in FIGS. 1 and 2 their detailed description will be omitted.

In the camera of FIG. 3, first and second automatic control loops 12 and 13 comprise a pick-up tube 1 forming a pick-up element, an automatic iris device 2, a variable gain amplifier 4 for a picked-up signal, first and second comparators (differential amplifiers) 7 and 8 to compare the video level of the picked-up signal of a pick-up signal system following the variable gain amplifier 4 with first and second reference voltages $V_{R1}$ and $V_{R2}$ and respectively to supply first and second compared output signals $V_{CI}$ and $V_{CG}$ to the automatic iris device 2 by way of an amplifier 19 and to the variable gain amplifier 4 to control them, a selecting circuit 14 for comparing a level of the second compared output signal $V_{CG}$ with a third reference voltage $V_N$ and for selecting and supplying either of them to the variable gain amplifier 4 so as to control it, and a control means 16 for ON/OFF controlling the selecting operation. It is arranged that when the amount of light incident on the pick-up tube 1 is above a predetermined value, the first control loop 12 is actuated, and when it is below the predetermined value, the second control loop 13 is actuated.

The loop gains are selected to be large enough for the level of a picked-up output signal $v_2$ with respect to the first and second control loops 12 and 13 to converge to $V_{R1}/K_2$ and $V_{R2}/K_2$ where $K_2$ denotes the gain of the level detector 11. Moreover, the response time is selected in such a manner that the first (iris) control loop 12 has a response time shorter than that of the second (AGC) control loop 13.

As shown in FIG. 4, the first and second comparators 7 and 8 have respective low-pass filter characteristics which can be represented by adders (subtracters) 7' and 8' followed by low-pass active filters 7'' and 8''. If the amplification factors are represented by $A_1$ and $A_2$, the transmission functions $F_1$ and $F_2$ of the filters 7'' and 8'' can be expressed as:

$$F_1 = A_1 \cdot \frac{\tau_1 \cdot S}{1 + \tau_1 \cdot S}$$

$$F_2 = A_2 \cdot \frac{\tau_2 \cdot S}{1 + \tau_2 \cdot S}$$

Thus, the relation between the first and second reference voltages $V_{R1}$ and $V_{R2}$ are selected so that $V_{R1}$ is greater than $V_{R2}$.

Returning to FIG. 3, the selecting circuit 14 will next be described. The selecting circuit 14 comprises (for example, npn transistors) $Q_1$ and $Q_2$ emitters of which are grounded through a common load resistor R, and the collectors of which are coupled to a dc voltage supply $+B$, so that signals to be selected are supplied to each base, and signals selected are developed at the emitters and supplied to the variable gain amplifier 4 as gain control signals. Such a circuit is termed a NAM (non additive mixing) circuit. The second compared output signal $V_{CG}$ from the second comparator 8 is supplied to the base of the transistor $Q_1$. The signal of the third reference voltage $V_N$ from a third variable reference voltage signal source 15 is supplied, through the control means 16, to the base of the transistor $Q_2$.

The control means 16 will be described next. The control means 16 comprises a transistor switching circuit 17 in which a movable contact m is coupled to the base of the transistor $Q_2$ and one fixed contact a is coupled to the third variable reference voltage signal source 15. Another fixed contact b is grounded. A manual ON/OFF switch 18 is provided to switch and control the switching circuit 17, and one end thereof is connected to a control terminal of the switching circuit 17. The other end thereof is grounded. In dependence on the lens system, that is, depending on whether the iris of the lens system is in automatic or manual mode, the switch 18 is respectively made OFF or ON so that the movable contact m of the switch 17 engages the fixed contact a or b respectively (the contrary arrangement may alternatively be used).

When the movable contact m of the switching circuit 17 engages the fixed contact a, the second compared output signal $V_{CG}$ of the second comparator 8 is compared in level with the third reference voltage $V_N$ by the selecting circuit 14, and the signal having the larger voltage is selected and supplied to the variable gain amplifier 4 as a control signal $V'_{CG}$.

Moreover, when the movable contact m of the switch 17 engages the fixed contact b, since the base of the transistor $Q_2$ assumes ground potential, the second compared output signal $V_{CG}$ is supplied, always through the emitter-follower transistor $Q_1$, to the variable gain amplifier 4 as the control signal $V'_{CG}$.

To describe the embodiment further reference will again be made to FIG. 4. Since a light amount $L_X$ of external light incident on the automatic iris device 2 passes through the automatic iris device 2 having a transfer function $G_1 = K_1 V_{CI}$ (which depends upon the diameter of the iris aperture, where $k_1$ represents a coefficient thereof), the light amount L incident on a pick-up target of the pick-up tube 1 is given as $L = G_1 L_X$. If the total gain of the pick-up tube 1 and the preamplifier 3 is $K_1$, the input signal $v_1$ to the variable gain amplifier 4 is given as $v_1 = K_1 L$. In FIG. 4, $v_2$ denotes an output signal (picked-up output signal) from the variable gain amplifier 4. If a conversion coefficient of the level detector 11 is $K_2$, the video level detecting output signal $V_C$ of the level detector 11 is expressed as $V_C=K_2 \cdot v_2$.

Next, a description will be given of the operation of the television camera of FIG. 3. When the light amount $L_X$ of the incident light is large enough, the automatic iris device 2 is controlled so as to reduce the light amount L incident on the pick-up target of the pick-up tube 1 thereby to make the incident amount of light an optimum suitable for use in photoelectric conversion. In this case, the gain of the variable gain amplifier 4 is arranged to be constant. In other words, if the light amount L is too large, the photo-electric conversion is carried out in a non-linear area of a photoelectric conversion layer of the pick-up tube 1 and the gradation or the colour reproducing characteristic of the picked-up video signal will be deteriorated. Also, if the light amount L is too small, the gain of the variable gain amplifier 4 has to be increased in order to make the level of the output signal $v_2$ constant. If so, the S/N ratio of the output signal $v_2$ will be lowered.

Not until the light amount $L_X$ is greatly reduced and a sufficient light amount L cannot be obtained even if the aperture of the automatic iris means 2 is at the maximum, is the gain of the variable gain amplifier 4 raised thereby to make the level of the output signal $v_2$ constant.

Thus, when the light amount $L_X$ of the incident light is large enough, the voltage of the second compared output signal $V_{CG}$ is kept low and this signal $V_{CG}$ is supplied to the variable gain amplifier 4 as the control signal $V'_{CG}$ via the selecting circuit 14. Since the level of the control signal $V'_{CG}$ is made substantially constant with the third reference voltage $V_N$, the gain thereof becomes constant.

Moreover, if the light amount $L_X$ of the incident light decreases, the voltage of the second compared output signal $V_{CG}$ is made larger than the third reference voltage $V_N$, so that the gain of the variable gain amplifier 4 is controlled in response to the output signal $V_{CG}$.

Referring to FIG. 5, the operation of the television camera of FIG. 3 will be further described. As seen in FIG. 5A, it is assumed that the light amount $L_X$ of the incident light changes gradually from a sufficiently large light amount $L_{X1}$ through a normal light amount $L_{X2}$ to an extremely small light amount $L_{X3}$. The point of change from $L_{X1}$ to $L_{X2}$ is taken as $t_1$, and the point of change from $L_{X2}$ to $L_{X3}$ is taken as $t_3$. FIG. 5B shows the change of the waveform of the incident light amount L on the pick-up tube 1 and letters $L_{MAX}$ and $L_{MIN}$ denote the maximum and minimum values thereof. FIG. 5C is a waveform of the picked-up output signal $v_2$, FIG. 5D is a waveform of the video level detecting signal of the level detector 11, FIG. 5E is a waveform of the first compared output signal $V_{C1}$, FIG. 5F is a waveform to illustrate a change of the aperture $G_1$ of the automatic iris device 2 and $G_{1MAX}$ and $G_{1MIN}$ therein designate maximum and minimum values thereof, FIG. 5G is a waveform of the second compared output signal $V_{CG}$, FIG. 5H is a waveform of the gain control signal $V'_{CG}$ for the variable gain amplifier 4, and FIG. 5I is a waveform to illustrate a change of the gain of the variable gain amplifier 4.

Since $V_{R1}$ is greater than $V_{R2}$ is established, since the level of the picked-up output signal $v_2$ is reduced to $V_{R1}/K_2$ in a region (period $T_o$) in which the light amount $L_X$ is $L_X=L_{X1}$, at that time. $V_C$ is greater than $V_{R1}$ is established and the level of the output signal $V_{CG}$ of the filter 8″ becomes lower than the third reference voltage $V_N$. Accordingly, $V_{CG}=V_N$ is established and the gain $G_2$ of the variable gain amplifier 4 is made constant irrespective of changes in the output signal $V_{CG}$. In other words, the second control loop 13 is not actuated.

Assuming that the light amount $L_X$ of the incident light is made lower so as to change from $L_{X1}$ to $L_{X2}$ at the time point $t_1$, the level of the picked-up output signal $v_2$ is rapidly lowered with a small time constant. Therefore, the voltage of the detecting output signal $V_C$ is compared with the second reference voltage $V_{R2}$ thereby to raise the output, which is the second compared output signal $V_{CG}$, of the filter 8″. However, since the time constant of the filter 8″ is adequately longer than that of the filter 7″, the first control loop 12 is converged before $V_{CG}$ is greater than or equal to $V_N$ is established. Hence, the second control loop 13 is not actuated. At a time point $t_2$, L, $v_2$ and $V_C$ are maximized. An expression $t_2-t_1$ designates an interval $T_1$ where $t_3-t_1$ is greater than $t_2-t_1$ is established.

Next, it is assumed that the light amount $L_X$ of the incident light is lowered from $L_{X2}$ to the $L_{X3}$ at the time point $t_3$. In this case, the maximum value $G_{1MAX}$ exists for the aperture $G_1$ of the automatic iris device 2. On this account, even if the control $V_{CI}$ is raised, the incident light amount L does not become large, but the level of the picked-up output signal $v_2$ is lowered. If the output signal $v_2$ continues to decrease in level, the voltage of the second compared output signal $V_{CG}$ derived from the comparison of the voltage of the video level detecting output signal $V_C$ with the second reference voltage $V_{R2}$ is continuously raised and utilimately $V_{CG}$ is greater than $V_N$ is established at a time point $t_4$ thereby to produce the output signal $V_{CG}(=V'_{CG})$ at the output side of the selecting circuit 14. Consequently, the second control loop 13 becomes operative. In this case, a period after the point $t_3$ is represented by period $T_2$.

When the automatic iris device 2 is in the automatic mode (which is a normal case), the movable contact m of the switching circuit 17 is changed over to engage the fixed contact a. However, when the iris is fixed (manual iris), the movable contact m of the switching circuit 17 is switched to engage the fixed contact b, so that in accordance with the change of the light amount $L_X$ of the incident light, only the gain of the variable gain amplifier 4 is controlled and the second control loop 13 is actuated for both increasing and decreasing directions of the gain. For example, when an endoscope is combined with the television camera, due to a change of a reflection factor of an internal organ wall surface, the light amount $L_X$ alters substantially.

Thus, as described, it is possible to obtain a television camera which with a simple arrangement, can provide a short response time of the total automatic control loop, stable automatic control, an optimum amount of incident light on the pick-up element, and a good S/N ratio of the picked-up signal.

Moreover, it is possible to provide a television camera which can positively and reliably select either of the compared output signal and the reference level signal from the comparator in accordance with the small and large level relation therebetween as the control signal to be supplied to the variable gain means for the camera signal.

Still further, the television camera can positively or reliably select either of the compared output signal and the reference level signal from the comparator in response to the small and large level relation therebetween as the control signal to be supplied to the variable gain means for the picked-up signal and can select only the compared output signal from the comparator as the control signal by switching.

In place of changing the gain of the variable gain amplifier 4, it is also possible to control a gate voltage of the pick-up tube 1. Moreover, the switch 18 can be interlocked with an auto/manual switching switch (not shown) provided for the automatic iris device 2.

Although the level detector 11 is made common to the first and second comparators 7 and 8 (which makes the arrangement of the television camera simple), the level detector 11 can be provided independently.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A television camera comprising pick-up means, iris means, variable gain amplifier means for a picked-up signal, and first and second comparators for comparing the video level of the picked-up signal as supplied from said variable gain amplifier means with first and second reference levels and respectively supplying first and second compared output signals from said first and second comparators, respectively, to said iris means and said variable gain amplifier means for respectively controlling them, thereby to form first and second automatic control loops, said first and second reference levels being selected so that, when the amount of light incident on said pickup means is above a predetermined value, only said first automatic control loop is actuated, and, when the amount of light incident on said pick-up means is below said predetermined value, only said second automatic control loop is actuated.

2. A television camera comprising pick-up means, iris means, variable gain amplifier means for a picked-up signal, first and second comparators for comparing the video level of said picked-up signal as supplied from said variable gain amplifier means with first and second reference levels and respectively supplying first and second compared output signals from said first and second comparators, respectively, to said iris means and said variable gain amplifier means for respectively controlling them, thereby to form first and second automatic control loops, said first automatic control loop comprising level detector means coupled to the output of said variable gain amplifier means, a first comparator receiving inputs from said level detector means and a first variable reference voltage signal source and supplying an output signal to control said iris means, and said second automatic control loop comprising said level detector means, a second comparator receiving inputs from said level detector means and a second variable reference voltage signal source and supplying an output signal, and selecting means for receiving said output signal from said second comparator and a signal from switching means which can supply either of two reference voltage signals, said selecting means for supplying an output signal to control the gain of said variable gain amplifier means, said first and second reference levels being selected so that, when the amount of light incident on said pick-up means is above a predetermined value, only said first automatic control loop is actuated, and, when the amount of light incident on said pick-up means is below said predetermined value, only said second automatic control loop is actuated.

3. A television camera according to claim 2 wherein said selecting means comprises two transistors with their collector-emitter paths connected in parallel to a common emitter resistor, said output signal from said second comparator being supplied to the base of one of said transistors and said signal from said switching means being supplied to the base of the other of said transistors, said output signal from said selecting means being derived from the emitters of said transistors.

4. A television camera according to claim 3; wherein said iris means has an automatic mode and a manual mode, and said signal from said switching means is derived from a third variable reference voltage source in one of said modes and is earth potential in the other of said modes.

5. A television camera comprising pick-up means, iris means, variable gain amplifier means for a picked-up signal, and first and second comparators for comparing a video level of the picked-up signal from said variable gain amplifier means with first and second reference levels and respectively supplying first and second compared output signals from said first and second comparators, respectively, to said iris means and to said variable gain amplifier means for respectively controlling them, selecting means for comparing a level of said second compared output signal with a third reference level and for selecting the signal of either level to be supplied to said variable gain amplifier means, thereby forming first and second automatic control loops operative such that when the amount of light incident on said pick-up means is above a predetermined value, said first automatic control loop is actuated to control said iris means, and when the amount of light incident on said pick-up means is below said predetermined value, said second automatic control loop is actuated to control said variable gain amplifier means.

6. A television camera comprising pick-up means, iris means, variable gain amplifier means for a picked-up signal, and first and second comparators for comparing a video level of the picked-up signal with first and second reference levels and respectively supplying first and second compared output signals from said first and second comparators, respectively, to said iris means and said variable gain amplifier means for respectively controlling them, selecting means for comparing the level of said second compared output signal with a third reference level and for selecting one of said second compared output signal and said third reference level to be supplied to said variable gain amplifier means, and controlling means for ON/OFF controlling said selecting means thereby to form first and second automatic control loops, said reference levels being selected so that, when the light incident on said pick-up means is above a predetermined value, said first automatic control loop is actuated, and when the light incident on said pick-up means is below said predetermined value, said second automatic control loop is actuated.

* * * * *